United States Patent
Wehrmann et al.

(10) Patent No.: US 9,718,951 B2
(45) Date of Patent: Aug. 1, 2017

(54) HIGH-TEMPERATURE (CO)POLYCARBONATES CONTAINING PHTHALIMIDE AND HAVING IMPROVED RHEOLOGICAL PROPERTIES

(71) Applicant: Bayer MaterialScience AG, Leverkusen (DE)

(72) Inventors: Rolf Wehrmann, Krefeld (DE); Helmut Werner Heuer, Leverkusen (DE); Anke Boumans, Goch (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/781,799

(22) PCT Filed: Apr. 1, 2014

(86) PCT No.: PCT/EP2014/056490
§ 371 (c)(1),
(2) Date: Oct. 1, 2015

(87) PCT Pub. No.: WO2014/161830
PCT Pub. Date: Oct. 9, 2014

(65) Prior Publication Data
US 2016/0040005 A1    Feb. 11, 2016

(30) Foreign Application Priority Data

Apr. 4, 2013   (EP) .................................... 13162260

(51) Int. Cl.
| | | |
|---|---|---|
| *C08L 45/00* | (2006.01) | |
| *C08L 69/00* | (2006.01) | |
| *C08L 83/08* | (2006.01) | |
| *C08G 77/26* | (2006.01) | |

(52) U.S. Cl.
CPC .............. *C08L 45/00* (2013.01); *C08L 69/00* (2013.01); *C08L 83/08* (2013.01); *C08G 77/26* (2013.01); *C08L 2207/04* (2013.01)

(58) Field of Classification Search
CPC ......... C08L 45/00; C08L 69/00; C08G 77/26; C08G 18/615; C08G 77/20
See application file for complete search history.

(56) References Cited

U.S. PATENT DOCUMENTS

| | | | |
|---|---|---|---|
| 4,075,173 A | 2/1978 | Maruyama et al. | |
| 4,156,069 A | 5/1979 | Prevorsek et al. | |
| 4,311,823 A | 1/1982 | Imai et al. | |
| 4,982,014 A | 1/1991 | Freitag et al. | |
| 5,344,910 A * | 9/1994 | Sybert .................... | C08G 64/12 528/125 |
| 5,672,645 A | 9/1997 | Eckel et al. | |
| 6,593,403 B1 | 7/2003 | Simon et al. | |
| 7,253,232 B2 | 8/2007 | Pfaendner et al. | |
| 7,547,755 B2 | 6/2009 | Heuer | |
| 9,139,730 B2 | 9/2015 | Wehrmann et al. | |

FOREIGN PATENT DOCUMENTS

| | | |
|---|---|---|
| DE | 2 232 877 A1 | 1/1974 |
| DE | 2 703 376 A1 | 8/1977 |
| DE | 2714544 A1 | 10/1977 |
| DE | 3 000 610 A1 | 7/1980 |
| DE | 3832396 A1 | 2/1990 |
| EP | 0363608 A1 | 4/1990 |
| EP | 0 640 655 A2 | 3/1995 |
| EP | 1 095 978 A1 | 5/2001 |
| WO | WO-99/55772 A1 | 11/1999 |
| WO | WO-2008037364 A1 | 4/2008 |
| WO | WO-2010108626 A1 | 9/2010 |

OTHER PUBLICATIONS

International Search Report for PCT/EP2014/056490 mailed Jul. 28, 2014.

* cited by examiner

*Primary Examiner* — Kuo-Liang Peng
(74) *Attorney, Agent, or Firm* — Drinker Biddle & Reath LLP

(57) ABSTRACT

The invention relates to (co)polycarbonate compositions and molding compounds, characterized by improved theological properties and a high heat deflection temperature.

9 Claims, No Drawings

HIGH-TEMPERATURE (CO)POLYCARBONATES CONTAINING PHTHALIMIDE AND HAVING IMPROVED RHEOLOGICAL PROPERTIES

CROSS-REFERENCE TO RELATED APPLICATIONS

This application is a national stage application (under 35 U.S.C. §371) of PCT/EP2014/056490, filed Apr. 1, 2014, which claims benefit of European Application No. 13162260.7, filed Apr. 4, 2013, both of which are incorporated herein by reference in their entirety.

The present invention relates to (co)polycarbonate compositions and molding compounds featuring improved rheological properties and a high heat distortion resistance.

BACKGROUND OF THE INVENTION (Co)polycarbonates belong to the group of industrial thermoplasts. Said (co)polycarbonates are used in varied applications in the fields of electrics and electronics, as materials of construction for lamp housings and in applications where there is a requirement not only for exceptional thermal and mechanical properties but also for outstanding optical properties, for example hairdryers, applications in the automotive sector, plastic covers, diffusing panels or light-guiding elements and also light covers, reflectors or light bezels.

The good thermal and mechanical properties such as Vicat temperature (heat distortion resistance) and glass transition temperature are almost always imperatively required in these applications. If a higher heat distortion resistance is required, recourse is made to specific bisphenols. This is generally accompanied by elevated melt viscosities which have a negative effect on processing, particularly in injection molding.

BRIEF SUMMARY OF THE INVENTION

The problem addressed was therefore that of developing (co)polycarbonates having improved rheological properties while leaving core properties, particularly mechanical and thermal properties, largely unchanged.

It was found that, surprisingly, a composition comprising (co)polycarbonate and organomodified siloxanes (OMS) having specific structures results in reduced melt viscosities and thus in improved rheological properties contrary to expectation. This measure for targeted enhancement of flowability, the adjustment thereof and the dependence thereof on the admixed siloxane was not hitherto known. This effect was particularly unexpected since EP 1095978 teaches that addition of, inter alia, an organomodified siloxane increases the melt viscosity (MFR), i.e. that flowability is worsened.

DETAILED DESCRIPTION OF THE INVENTION

The invention provides mixtures comprising
A) from 99.9 to 92.0 parts by weight, preferably from 99.7 to 94.0 parts by weight (based on the sum of components A+B) of high molecular weight, thermoplastic, aromatic (co)polycarbonate having a molecular weight Mw (weight average) of at least 10 000 gmol$^{-3}$, preferably of from 15 000 gmol$^{-1}$ to 300 000 gmol$^{-1}$, and comprising structural units of one or more of formulae (Ia), (Ib) and (Ic),

(Ia)

(Ib)

(Ic)

where R in each case represents hydrogen, $C_1$-$C_4$ alkyl, aryl or aralkyl, preferably methyl or phenyl;

B) from 0.1 to 8.0 parts by weight, preferably from 0.3 to 6.0 parts by weight, (based on the sum of components A+B) of one or more organically modified telechelic or comb polysiloxanes preferably selected from the group consisting of polysiloxanes of general formulae (IIa) and (IIb)

(IIa)

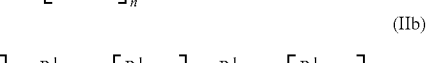

(IIb)

where the radicals
$R^1$ in a molecule are identical or different and represent alkyl radicals comprising from 1 to 4 carbon atoms,
A are identical or different and represent —$R^2$—X, where $R^2$ is a radical having the general formula (IIc)

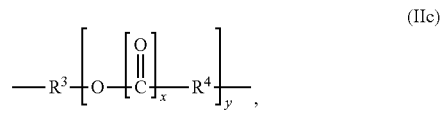

$R^3$ is a divalent, optionally substituted alkyl or alkenyl radical comprising from 2 to 11 carbon atoms ($C_2$-$C_{11}$ alkyl or $C_2$-$C_{11}$ alkenyl), $R^4$ are identical or different at each occurrence and are divalent, optionally substituted alkyl or aralkyl radicals, x independently of one another has a value of 0 or 1, y independently of one another has a value of from 0 to 100 and X is a vinyl, amino, carboxyl, epoxy or hydroxy group, n, k and r each independently of one another represent a number between 0 and 200, preferably between 0 and 100, subject to the proviso that n, k and r are not all 0, and optionally additives (component C);

where all parts by weight values reported in the present application are normalized such that the sum of the parts by weight for components A+B in the composition amount to 100.

The mixtures may optionally comprise further additives (component C), such as UV absorbers, demolding auxiliaries or heat stabilizers, in amounts of from 50 to 5000 ppm in each case, based on the sum of components A+B.

The mixtures may further comprise as additives inorganic fillers such as glass fibers, carbon fibers or pigments, for example titanium dioxide, silica or barium sulfate present as additives in amounts of up to 35 wt % based on the sum of components A+B.

Injection molded parts or extrudates produced from the (co)polycarbonates and (co)polycarbonate compositions according to the invention exhibit significantly improved rheological properties while mechanical and thermal properties are virtually unchanged. This represents an important criterion for the injection molding, mechanical and thermal performance of the material or the injection molded or extruded component part.

In the context of the present invention $C_1$-$C_4$ alkyl represents methyl, ethyl, n-propyl, isopropyl, n-butyl, sec-butyl, tert-butyl for example, $C_1$-$C_6$ alkyl further represents n-pentyl, 1-methylbutyl, 2-methylbutyl, 3-methylbutyl, neo-pentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropy or 1-ethyl-2-methylpropyl for example, $C_1$-$C_{11}$ alkyl further represents n-heptyl and n-octyl, pinacyl, adamantyl, the isomeric menthyls, n-nonyl, n-decyl, n-undecyl for example, $C_1$-$C_{34}$ alkyl further represents n-dodecyl, n-tridecyl, n-tetradecyl, n-hexadecyl or n-octadecyl for example. The same is true for the corresponding alkyl radical, for example in aralkyl/alkylaryl, alkylphenyl or alkylcarbonyl radicals. Alkylene radicals in the corresponding hydroxyalkyl or aralkyl/alkylaryl radicals represent, for example, the alkylene radicals corresponding to the preceding alkyl radicals.

In the context of the present invention alkenyl represents a straight-chain, cyclic or branched alkenyl radical preferably comprising from 2 to 11 ($C_2$-$C_{11}$), preferably from 2 to 6 ($C_2$-$C_6$) carbon atoms. Examples of alkenyl include vinyl, allyl, isopropenyl and n-but-2-en-1-yl.

Aryl represents a carbocyclic aromatic radical comprising from 6 to 34 skeleton carbon atoms. The same applies to the aromatic part of an arylalkyl radical, also known as an aralkyl radical, and also to aryl constituents of more complex groups, for example arylcarbonyl radicals.

Examples of $C_6$-$C_{34}$ aryl include phenyl, o-, p-, m-tolyl, naphthyl, phenanthrenyl, anthracenyl and fluorenyl.

Arylalkyl and aralkyl each independently represent a straight-chain, cyclic, branched or unbranched alkyl radical as defined above, which may be mono-, poly- or persubstituted with aryl radicals as defined above.

The above lists are illustrative and should not be understood as being limiting.

In the context of the present invention ppb and ppm are to be understood as meaning parts by weight unless otherwise stated.

In the context of the present invention thermoplastic, aromatic (co)polycarbonates are both homopolycarbonates and copolycarbonates of different diphenol units and in the present application the term (co)polycarbonate also subsumes homopolycarbonates of diphenol units of formula (V), Aromatic (co)polycarbonates suitable in accordance with the invention are known from the literature or may be produced by literature processes (for preparation of aromatic (co)polycarbonates see, for example, Schnell, "Chemistry and Physics of Polycarbonates", interscience Publishers, 1964, and DE-AS 1 495 626, DE-A 2 232 877, DE-A 2 703 376, DEA 2 714 544, DE-A 3 000 610, DE-A 3 832 396).

Aromatic (co)polycarbonates are produced, for example, by reacting diphenols with carbonic halides, preferably phosgene, by the phase interface process, optionally using chain terminators, for example monophenols, and optionally using trifunctional or more than trifunctional branching agents, for example triphenols or tetraphenols. Production via a melt polymerization process by reaction of diphenols with, for example, diphenyl carbonate is likewise possible.

In addition to the diphenol derivatives of formulae IIIa to IIIc,

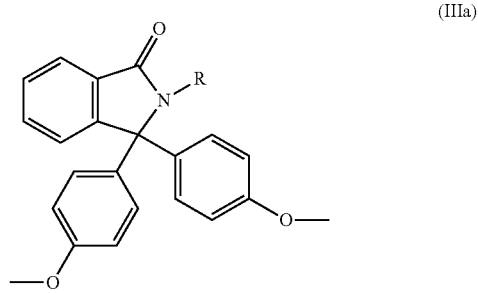

(IIIa)

-continued

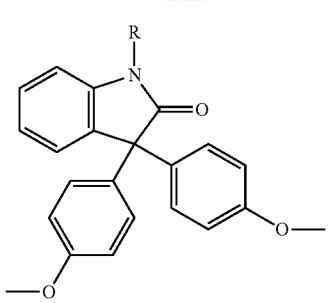
(IIIb)

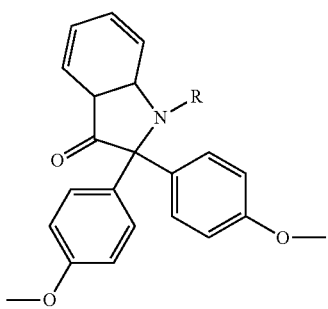
(IIIc)

where R in each case represents hydrogen, $C_1$-$C_4$ alkyl, aryl or aralkyl, preferably methyl or phenyl;
suitable dihydroxyaryl compounds for producing the (co)polycarbonates include those of formula (IV)

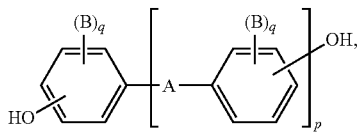
(IV)

where
A is a single bond, $C_1$ to $C_5$ alkylene, $C_2$ to $C_5$ alkylidene, $C_5$ to $C_6$ cycloalkylidene, —O—, —SO—, —CO—, —S—, —$SO_2$—, $C_6$ to $C_{12}$ arylene, onto which may be fused further aromatic rings optionally containing heteroatoms, or a radical of formula (V) or (VI)

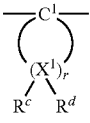
(V)

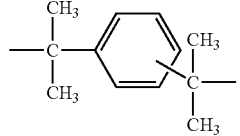
(VI)

B is in each case hydrogen, $C_1$ to $C_{12}$ alkyl, preferably methyl, halogen, preferably chlorine and/or bromine,
q is in each case independently of one another 0, 1 or 2,
p is 1 or 0, and
$R^c$ and $R^d$ are individually selectable for each $X^1$ and independently of one another represent hydrogen or $C_1$ to $C_6$ alkyl, preferably hydrogen, methyl or ethyl,
$X^1$ represents carbon and
r represents an integer from 4 to 7, preferably 4 or 5, with the proviso that for at least one $X^1$ atom $R^c$ and $R^d$ are both alkyl.

Examples of diphenols of formula (IV) that are suitable for producing the (co)polycarbonates to be used according to the invention include hydroquinone, resorcinol, bis(hydroxyphenyl) alkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl) diisopropylbenzenes and also the alkylated, ring-alkylated and ring-halogenated compounds thereof.

Preferred further diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,3-bis[2-(3,5-dimethyl-4-hydroxyphenyl)-2-propyl]benzene.

Particularly preferred diphenols are 2,2-bis(4-hydroxyphenyl)propane (BPA) and 2,2-bis(3-methyl-4-hydroxyphenyl)propane (dimethyl BPA).

Particular preference is given to (co)polycarbonates of bisphenol A and the bisphenol units according to IIIa to IIIc, it being particularly preferable when R represents phenyl and methyl.

The diphenols may be used individually or in the form of any desired mixtures. The diphenols are known from the literature or obtainable by literature processes.

These and further suitable diphenols are commercially available and described in "H. Schnell, Chemistry and Physics of Polycarbonates, Interscience Publishers, New York 1964, p. 28ff; p. 102ff", and in "D. G. Legrand, J. T. Bendler, Handbook of Polycarbonate Science and Technology, Marcel Dekker New York 2000, p. 72ff." for example.

Examples of chain terminators suitable for the production of the thermoplastic, aromatic (co)polycarbonates include phenol, p-tert-butylphenol and cumylphenol. The amount of chain terminators to be employed is generally between 0.5 mol % and 10 mol % based on the molar sum of the diphenols used in each case.

The thermoplastic, aromatic (co)polycarbonates may be branched in a known manner, preferably through the incorporation of from 0.05 to 2.0 mol %, based on the sum of the diphenols employed, of trifunctional or more than trifunctional compounds, for example those comprising three or more phenolic groups.

In a preferred embodiment of the invention the aromatic (co)polycarbonates have a weight-average molecular weight ($M_w$, determined by GPC, ultracentrifugation or light scattering for example) greater than 10 000 gmol$^{-1}$, a weight-average molecular weight of from 20 000 gmol$^{-1}$ to 300 000 gmol$^{-1}$ being particularly preferred.

The thermoplastic, aromatic (co)polycarbonates may be employed on their own or in any desired mixture, preferably with further aromatic polycarbonates.

The diphenols employed, similarly to all other chemicals and assistants added to the synthesis, may be contaminated with the contaminants from their own synthesis, handling and storage. However, it is desirable to employ the purest possible raw materials.

The specific OMS employed may be various telechelic or comb siloxanes, for example the Tegomer® range from Evonik Industries AG, Essen, or mixtures thereof.

The compositions according to the invention may comprise further commercially available polymer additives such as flame retardants, flame retardancy synergists, antidripping agents (for example compounds of the fluorinated polyolefin, silicone and aramid fiber substance classes), gliding and demolding agents (for example pentaerythritol tetrastearate), nucleating agents, stabilizers, antistats (for example conductive carbon blacks, carbon fibers, carbon nanotubes and organic antistats such as polyalkylene ethers, alkylsulfonates or polyamide-containing polymers) and colorants and pigments in amounts that do not impair the mechanical properties of the composition to the extent that it no longer achieves the target profile of properties (no brittle fracture at −10° C.).

Flame retardants employed are preferably phosphorous-containing flame retardants, in particular selected from the groups of monomeric and oligomeric phosphoric and phosphonic esters, phosphonate amines and phosphazenes, it also being possible to employ as flame retardants mixtures of a plurality of components selected from one or more of these groups. Other preferably halogen-free phosphorus compounds not specifically mentioned here may also be employed alone or in any desired combination with other preferably halogen-free phosphorus compounds. Examples of suitable phosphorous compounds include: tributyl phosphate, triphenyl phosphate, tricresyl phosphate, diphenyl cresyl phosphate, diphenyl octyl phosphate, diphenyl 2-ethylcreysl phosphate, tri(isopropylphenyl) phosphate, resorcinol-bridged diphosphate or oligophospate and bisphenol A-bridged diphosphate or oligophospate. The use of oligomeric phosphoric esters derived from bisphenol A is particularly preferred. Phosphorous compounds suitable as flame retardants are known (cf. EP-A 0 363 608, EP-A 0 640 655 for example) or may be produced by known methods in analogous fashion (for example Ullmanns Enzyklopädie der technischen Chemie, vol. 18, p. 301 ff, 1979; Houben-Weyl, Methoden der organischen Chemie, vol. 12/1 p. 43; Beilstein vol. 6, p. 177).

The addition of additives aids extension of service life or color (stabilizers), simplification of processing (e.g. demolding agents, flow auxiliaries, antistats) or tailoring of the polymer properties to particular stresses (impact modifiers, such as rubbers; flame retardants, colorants, glass fibers).

These additives may be added to the polymer melt individually or in any desired mixtures or a plurality of different mixtures, directly on isolation of the polymer or else after melting down pellets in what is known as a compounding step. The additives or the mixtures thereof may be added to the polymer melt as a solid, i.e. as a powder, or as a melt, Another method of dosing is the use of masterbatches or mixtures of masterbatches of the additives or additive mixtures.

Suitable additives are described in, for example, "Additives for Plastics Handbook, John Murphy, Elsevier, Oxford 1999" and in "Plastics Additives Handbook, Hans Zweifel, Hanser, Munich 2001" or in WO 99/55772, p. 15-25.

Suitable heat stabilizers are preferably tris(2,4-di-tert-butylphenyl) phosphite (Irgafos 168), tetrakis(2,4-di-tert-butylphenyl)[1,1-biphenyl]-4,4'-diyl bisphosphonite, trisisooctyl phosphate, octadecyl-3-(3,5-di-tert-butyl-4-hydroxyphenyl) propionate (Irganox 1076), bis(2,4-dicumylphenyl) pentaerythritol diphosphite (Doverphos S-9228-PC), bis(2,6-di-tert-butyl-4-methylphenyl) pentaerythritol diphosphite (ADK STAB PEP-36) or Triphenylphosphine. Said stabilizers are employed on their own or as mixtures (for example Irganox B900 or Doverphos S-9228-PC with Irganox B900 or Irganox 1076).

Suitable demolding agents are preferably pentaerythritol tetrastearate, glycerol monostearate, stearyl stearate or propanediol monostearate or distearate. Said demolding agents are employed on their own or as mixtures.

Suitable UV stabilizers are preferably 2-(2'-hydroxyphenyl)benzotriazoles, 2-hydroxybenzophenones, esters of substituted and unsubstituted benzoic acids, acrylates, sterically hindered amines, oxamides, 2-(2-Hydroxyphenyl)-1,3,5-triazines, particular preference being given to substituted benzotriazoles such as Tinuvin 360, Tinuvin 234, Tinuvin 329 or Tinuvin 1600/Tinuvin 312 for example (BASF SE, Ludwigshafen).

It is further possible to add colorants, such as organic colorants or pigments or inorganic pigments, IR absorbers, individually, as mixtures or else in combination with stabilizers, (hollow) glass spheres, inorganic fillers or organic or inorganic diffusing pigments.

The inventive thermoplastic molding compounds are produced by mixing the respective constituents and melt compounding and melt extruding the resulting mixture at temperatures of from 200° C. to 380° C., preferably from 240° C. to 360° C., more preferably from 250° C. to 350° C., in customary apparatuses such as internal kneaders, extruders and twin-shaft screw systems in a known manner.

The mixing of the individual constituents may be carried out in a known manner, either successively or simultaneously, either at about 20° C. (room temperature) or at a higher temperature.

The invention further provides for the use of OMS comprising at least one structural unit of general formula (IIa) or (IIb) in a process for producing (co)polycarbonates comprising at least one diphenol unit of formulae (IIIa), (IIIb) and (IIIc)

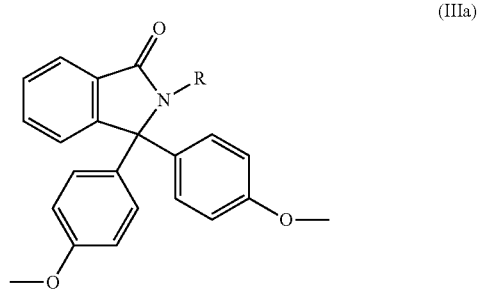

(IIIa)

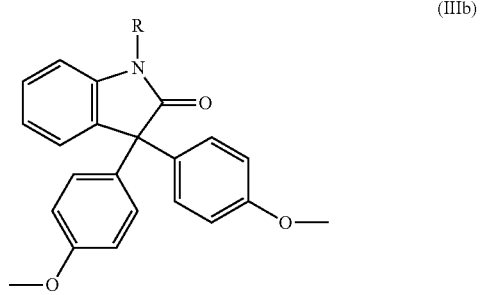

(IIIb)

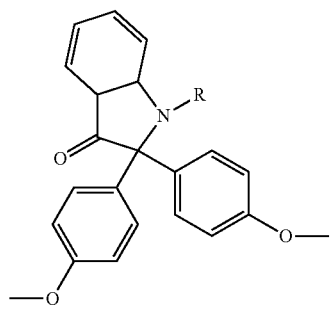

(IIIc)

where R in each case represents hydrogen, $C_1$-$C_4$ alkyl, aryl or aralkyl, preferably methyl or phenyl;
wherein the polysiloxanes(s) is/are admixed with the (co)polycarbonate.

The invention likewise provides processes for producing the molding compounds by compounding, kneading or in a dissolving operation and subsequent removal of the solvent and also provides for the use of the molding compounds for the production of molded articles.

The molding compounds according to the invention may be used for producing any type of molded articles. These may be produced by injection molding, extrusion and blow-molding processes for example. A further form of processing is the production of molded articles by deep drawing from previously produced sheets or films.

The (co)polycarbonates and (co)polycarbonate compositions of the invention may be processed in customary fashion on customary machines, for example on extruders or injection molding machines, to afford any desired molded articles or molded parts, films and film laminates or sheets or bottles, The (co)polycarbonates thus obtainable may be used for producing extrudates (sheets, films and laminates thereof; e.g. for card applications and pipes) and molded articles, for example sheets, sandwich panels, diffusing or covering panels, light covers, bezels, reflectors etc. Said (co)polycarbonates may further be used for producing articles for the fields of electrics/electronics and IT, for example housings, connectors, brackets etc.

The (co)polycarbonate compositions are in particular used for producing compounds, blends and component parts where thermal and mechanical properties combined with good flowability, i.e. reduced melt viscosities, are utilized, for example housings, articles in the fields of electrics/electronics, such as connectors, switches, sheets, light mounts, light covers, automotive sector such as light fittings and covers and other applications.

The extrudates and molded articles/molded parts made of the polymers according to the invention also form part of the subject matter of the present application.

Further possible applications for the (co)polycarbonate molding compounds according to the invention include: translucent plastics materials having a glass fiber content for applications in optics (see DE-A 1 554 020 for example), for producing small injection molded precision parts, for example lens mounts. Employed therefor are (co)polycarbonates which have a content of glass fibers and optionally further comprise about 1 to 10 wt % of $MoS_2$ based on the total weight.

The examples which follow serve to further elucidate the invention and should not be seen as limiting.

EXAMPLES

Production of the compounds employed the following raw materials:

PC-1: Lexan X141'2141; high heat copolycarbonate from Sabic Innovative Plastics having an MVR of 40 $cm^3$/10 min (330° C. 2.16 kg)

Tegomer® A-Si 2322: alpha,omega-amine-terminated siloxane from Evonik Industries AG, Essen.

A multi-screw extruder was used to produce various test mixtures of the amine-terminated siloxane Tegomer® A-Si 2322 with the base copolycarbonate PC-1 at a temperature of 330° C., As a control, the rheological properties of the blends are compared with PC-1 without additives. A summary of the properties is contrasted with the comparative example (sample without additives) in Table 2 which follows.

Determination of the melt volume-flow rate (MVR) was carried out according to ISO 1133 (at a test temperature of 300° C., mass 1.2 kg) using a Göttfert MI-ROBO 8998 instrument from Göttfert or a Zwick 4106 instrument from Zwick Roell.

TABLE 1

| Formulation: | | -1 | -2 | -3 |
|---|---|---|---|---|
| Lexan XHT2141 | % | 100 | 98.5 | 97 |
| Tegomer A-Si 2322 | % | — | 1.5 | 3 |

TABLE 2

| Tests: | | -1 | -2 | -3 |
|---|---|---|---|---|
| MVR 330° C./2.16 kg | $cm^3$/10 min | 40.0 | 62.7 | 69.8 |
| IMVR20' 330° C./2.16 kg | $cm^3$/10 min | 40.5 | 63.7 | 73.7 |

It is clearly apparent that the MVR is significantly increased due to the addition of the siloxane, i.e. the melt viscosity is reduced and the flowability is thus increased.

TABLE 3

| Melt viscosity 300° C. | | | | |
|---|---|---|---|---|
| eta 50 | Pas | 536 | 353 | 300 |
| eta 100 | Pas | 525 | 343 | 294 |
| eta 200 | Pas | 504 | 320 | 274 |
| eta 500 | Pas | 440 | 249 | 225 |
| eta 1000 | Pas | 353 | 191 | 175 |
| eta 1500 | Pas | 295 | 164 | 150 |
| eta 5000 | Pas | 143 | 100 | 98 |
| Melt viscosity 320° C. | | | | |
| eta 50 | Pas | 287 | 175 | 147 |
| eta 100 | Pas | 281 | 171 | 145 |
| eta 200 | Pas | 275 | 164 | 134 |
| eta 500 | Pas | 253 | 146 | 120 |
| eta 1000 | Pas | 219 | 122 | 107 |
| eta 1500 | Pas | 194 | 107 | 97 |
| eta 5000 | Pas | 108 | 62 | 49 |
| Melt viscosity 330° C. | | | | |
| eta 50 | Pas | 178 | 121 | 106 |
| eta 100 | Pas | 168 | 117 | 104 |
| eta 200 | Pas | 166 | 114 | 101 |
| eta 500 | Pas | 154 | 108 | 96 |
| eta 1000 | Pas | 146 | 93 | 82 |
| eta 1500 | Pas | 135 | 84 | 72 |
| eta 5000 | Pas | 88 | 47 | 39 |

TABLE 3-continued

| Melt viscosity 340° C. | | | | |
|---|---|---|---|---|
| eta 50 | Pas | 148 | 90 | 79 |
| eta 100 | Pas | 143 | 87 | 76 |
| eta 200 | Pas | 141 | 85 | 75 |
| eta 500 | Pas | 133 | 83 | 71 |
| eta 1000 | Pas | 124 | 73 | 63 |
| eta 1500 | Pas | 117 | 67 | 58 |
| eta 5000 | Pas | 77 | 34 | 31 |
| Melt viscosity 360° C. | | | | |
| eta 50 | Pas | 81 | 51 | 42 |
| eta 100 | Pas | 80 | 48 | 42 |
| eta 200 | Pas | 79 | 47 | 40 |
| eta 500 | Pas | 78 | 46 | 39 |
| eta 1000 | Pas | 75 | 45 | 38 |
| eta 1500 | Pas | 74 | 43 | 38 |
| eta 5000 | Pas | 57 | 29 | 25 | eta: Shear rates in units of [s$^{-1}$].

It is apparent that the flow curves show markedly lower viscosities, i.e. the compositions according to the invention exhibit better flow than the employed base resin Lexan XHT 2141 at all temperatures. The improved flow behavior is obtained over the entire shear range and at various temperatures.

The invention claimed is:

1. A composition comprising
A) from 99.9 to 92 parts by weight (based on the sum of components A+B) of high molecular weight, thermoplastic, aromatic (co)polycarbonate having a molecular weight Mw (weight average) of at least 10 000 g·mol$^{-1}$ and comprising structural units of one or more of formula(e) (Ia), (Ib) and (Ic),

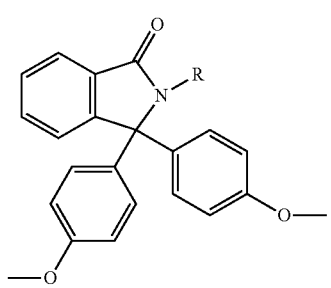
(Ia)

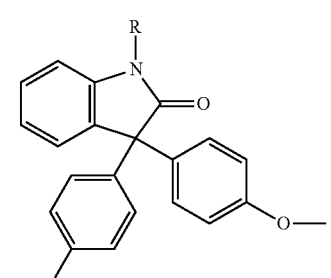
(Ib)

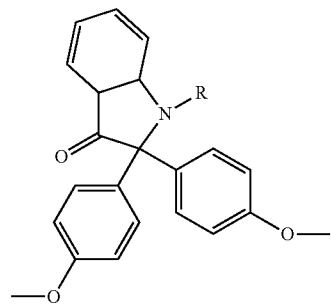
(Ic)

where R in each case represents hydrogen, $C_1$-$C_4$ alkyl, aryl or aralkyl;
B) from 0.1 to 8 parts by weight (based on the sum of components A+B) of one or more organically modified telechelic or comb polysiloxanes selected from the group consisting of polysiloxanes of general formulae (IIa) and (IIb)

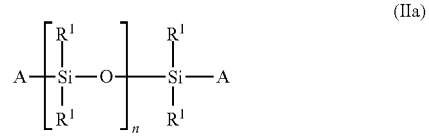
(IIa)

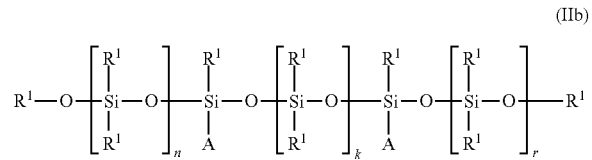
(IIb)

where the radicals
$R^1$ are identical or different and represent alkyl radicals comprising from 1 to 4 carbon atoms,
A are identical or different and represent —$R_2$—X, where
$R^2$ is a radical having the general formula (IIC)

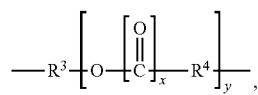
(IIc)

$R^3$ is a divalent, optionally substituted alkyl or alkenyl radical comprising from 2 to 11 carbon atoms,
$R^4$ are identical or different at each occurrence and are divalent, optionally substituted alkyl or aralkyl radicals,
x independently of one another has a value of 0 or 1,
y independently of one another has a value of from 0 to 100 and
X is a vinyl, amino, carboxyl, epoxy or hydroxy group,
n, k and r each independently of one another represent a number between 0 and 200, subject to the proviso that n, k and r are not all 0,
and
C) optionally additives.

2. The composition as claimed in claim 1, wherein the (co)polycarbonate A) has a molecular weight Mw (weight average) of from 15 000 g·mol$^{-1}$ to 300 000 g·mol$^{-1}$.

3. The composition as claimed in claim 1, wherein component A) is employed in amounts of from 99.7 to 94 parts by weight and component B) is employed in amounts of from 0.3 to 6 parts by weight (based on the sum of components A+B).

4. The composition as claimed in claim 1, wherein said composition comprises an additive, a UV absorbers, a demolding auxiliary or a heat stabilizer, in an amount of from 50 to 5000 ppm by weight in each case, based on the sum of components A+B.

5. The composition as claimed in claim 1 comprising at least one of the following structures as structural units of formula (Ia) and/or (Ib)

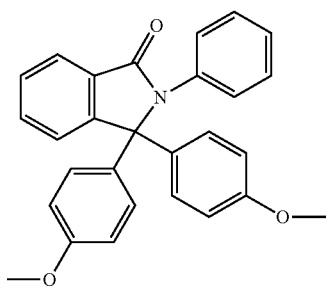

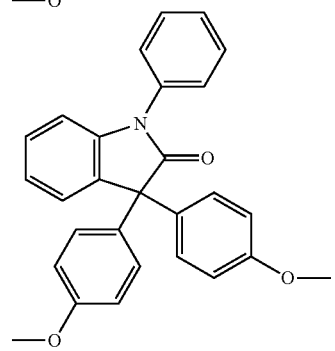

-continued

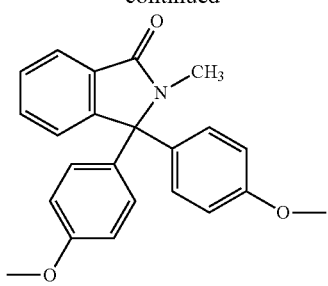

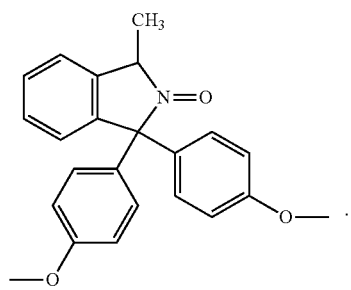

6. A process for producing the composition as claimed in claim 1 comprising mixing the constituents to form a mixture and melt compounding and melt extruding the mixture at elevated temperature.

7. A method for producing a molded part utilizing the compositions as claimed in claim 1.

8. A molded parts comprising the composition as claimed in claim 1.

9. A method for producing blend comprising adding the composition as claimed in claim 1.

* * * * *